United States Patent [19]
Rogers

[11] 3,793,987
[45] Feb. 26, 1974

[54] DOMESTIC APPLIANCE FOR PETS

[76] Inventor: Crosby U. Rogers, 355 Silver Hill Rd., Easton, Conn. 06612

[22] Filed: Feb. 5, 1973

[21] Appl. No.: 329,600

[52] U.S. Cl. .................................................. 119/1
[51] Int. Cl. ........................................... A01k 29/00
[58] Field of Search ............................... 119/1, 158

[56] References Cited
UNITED STATES PATENTS

| | | | |
|---|---|---|---|
| 3,734,057 | 5/1973 | Lee ......................................... | 119/1 |
| 2,661,865 | 12/1953 | Wendt ............................. | 119/158 X |
| 1,760,017 | 5/1930 | Smoot .................................... | 119/1 |
| 3,023,734 | 3/1962 | Schaub ........................... | 119/158 X |
| 3,529,577 | 9/1970 | McNenemy, Jr. et al. ...... | 119/158 X |

*Primary Examiner*—Hugh R. Chamblee
*Attorney, Agent, or Firm*—H. Gibner Lehmann; K. Gibner Lehmann

[57] ABSTRACT

A domestic appliance for use in homes, apartments, condominiums and the like to eliminate the need for taking a pet outside. The appliance serves to facilitate washing the pet, and also serves as a convenient toilet therefor. It comprises a small enclosure or housing with entrance and exit doors, the housing having a bottom wall sloped toward one area where a drain opening is arranged to remove liquid and solids from the low bottom wall area by means of a retractable flexible hose which is adapted to extend over the rim of a toilet flush bowl. Inside the housing there is disposed a series of water jets which are connected to one end of another hose, the other end of which has a fitting for attachment to a bathroom sink faucet. The appliance is so arranged that it can be used either as a pet bath, or as a pet waste disposal apparatus, in which latter case the inside of the housing can be sprayed clean by means of the water jets, and the pump actuated to remove the rinse water and solids, so as to dispose of the same into the flush bowl. The top of the housing additionally has a grill and doors which latter can be opened to permit the owner to observe the pet while it is inside.

17 Claims, 4 Drawing Figures

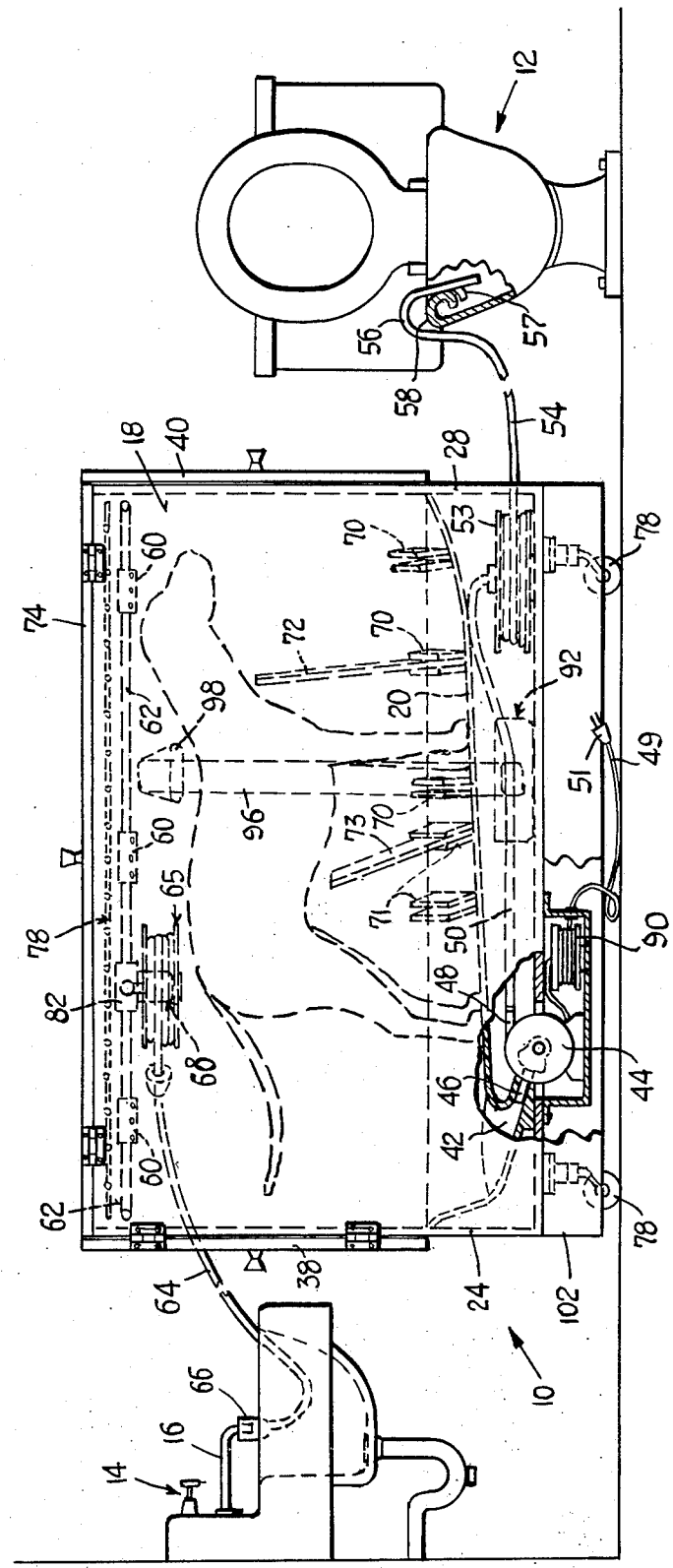

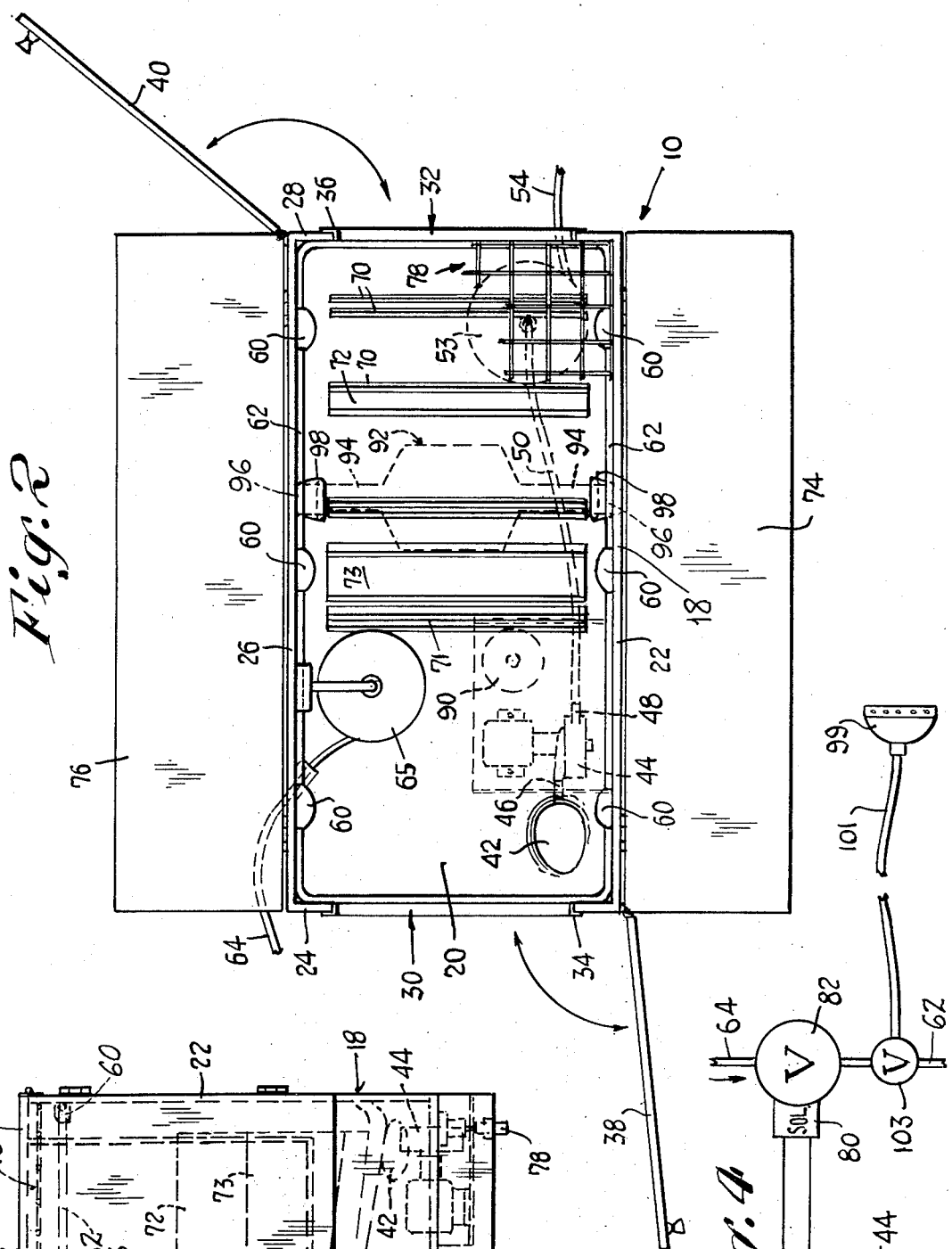
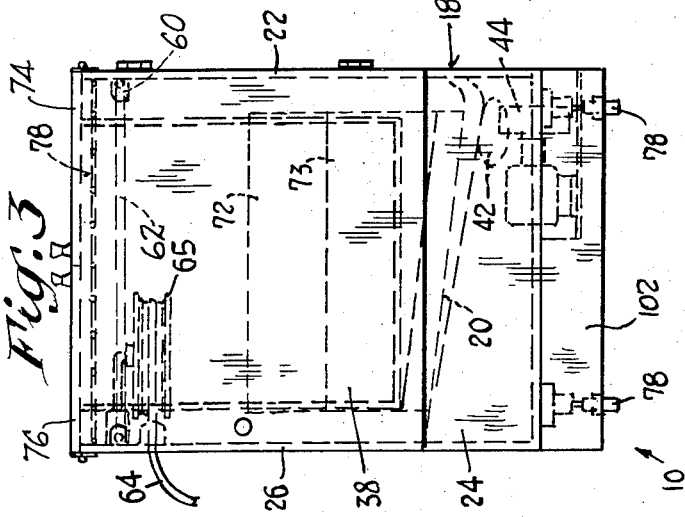
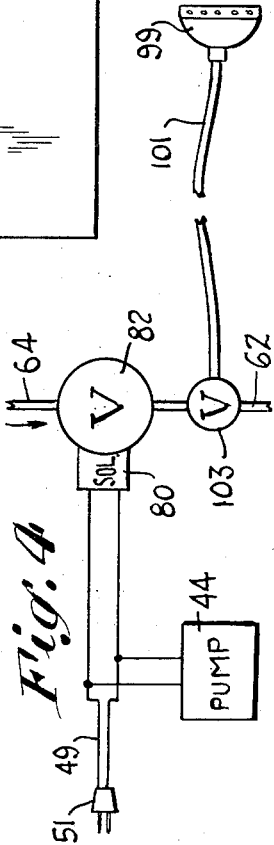

3,793,987

1

DOMESTIC APPLIANCE FOR PETS

BACKGROUND

This invention relates generally to pet baths and waste disposals devices, and more particularly to portable units which can be readily employed in dwellings, with existing bathroom facilities. In the past various pet baths and waste disposal devices for indoor use have been proposed and constructed. Some waste disposal units have employed open tray-like structures with catch basins, wherein a series of spray nozzles was arranged to rinse the basin, following use. Others included an inlet hose for connection with a faucet, while still others employed a modified flush-tank arrangement mounted on a substantial distance above the location of the nozzles in order to develop sufficient water pressure. There was usually a drain opening at the low point of the basin, which was connected with an outlet fitting of some type. While some of these waste disposal units could operate satisfactorily, they all had a number of distinct disadvantages. In the case of the open-tray type apparatus, only limited areas could be sprayed and there was usually danger of splashing onto areas of the adjacent walls or floor, thus giving rise to unsanitary conditions after prolonged use. In addition, unless the drain of the unit was permanently connected with a sewer pipe or the like, the sanitary disposal of the waste and rinse water frequency presented distinct problems. Also, in some of the devices heretofore proposed it has been difficult to accommodate large pets. Moreover, the training required of the pets, to teach them to properly use these prior devices, has presented an obstacle which was difficult to overcome.

SUMMARY

The above drawbacks and disadvantages of prior pet baths and waste disposal devices are obviated by the present invention, which has for its main object the provision of a novel and improved portable domestic appliance of the type indicated for pets, which is especially simple in its construction, easy and convenient to use, and wholly effective in its operation. A related object of the invention is the provision of an apparatus as above set forth which requires only temporary attachment to existing bathroom facilities.

The above objects are accomplished by a novel combination of a normally watertight enclosure or housing having a bottom wall provided with a recessed drain aperture, an electrically operated pump carried by the housing and connected with the drain aperture, a retractable hose connected with the outlet of the pump and having a rigid hook portion extending outside the housing, the rigid portion comprising a spout adapted to hook over and empty into an existing flush bowl, and a series of water jets carried inside the housing and communicating with another, retractable hose for temporary connection to a faucet. The housing is further provided with a series of doors to facilitate entry and exit by the animal, and to permit observation of the animal by the owner. The appliance can be used either as a pet washing apparatus or a pet waste disposal apparatus. In use, the hook portion of the first hose is positioned over the lip of the bowl, and the pump actuated. Water from the faucet can then be sprayed from the jets to accomplish a washing or rinsing operation of the pet or of the interior of the housing. Simultaneously, the pump removes water from the housing and disposes of it into the bowl. In addition, the present invention provides a novel control means comprising an electrically energized solenoid valve in the water supply line connected to the faucet, which is wired in parallel with the pump and thus operates to prevent water from entering the housing until the pump is energized. This arrangement minimizes the likelihood of a flood in the event that the apparatus is inadvertently left unattended for a period of time.

Features of the invention reside in the provision of a novel reeling device for the inlet and discharge hoses, as well as for the electric supply cord; and reside in the further provision of electric heater means for supplying drying air to the animal after the washing operation. Also, the water discharge hose has incorporated a safety hook device to prevent it from inadvertently slipping off the toilet bowl. In the embodiment shown the cabinet has recesses for accommodating the reels for the hoses and cord, and has a finished exterior appearance whereby it resembles an article of furniture.

Other features and advantages will hereinafter appear.

In the drawing, illustrating a preferred embodiment of the invention:

FIG. 1 is a front elevational view of the waste disposal apparatus of the present invention, shown ready for use wherein the outlet hose is positioned over a flush bowl, and the inlet hose is connected to a faucet.

FIG. 2 is a top plan view of the apparatus of FIG. 1.

FIG. 3 is a left and elevational view of the apparatus of FIG. 2.

FIG. 4 is a schematic diagram of a control means comprising a solenoid valve connected in series with the water supply line to the housing, the valve being normally closed when the pump is not energized.

Referring to the figures there is illustrated a novel domestic appliance for a pet, designed generally by the numeral 10, said device being adapted for use in a dwelling with the existing bathroom facilities thereof including a conventional flush bowl 12 and a water faucet 14 having a spout portion 16. The apparatus comprises a housing 18 having a watertight, sloping bottom wall 20 and upright walls 22, 24, 26 and 28. The opposite walls 23 and 28 have openings 30, 32 which are provided with resilient sealing gaskets 34 and 36 respectively. An entry door 38 and an exit door 40 are also provided, these doors when closed constituting a watertight seal of the openings 30, 32. The bottom floor 20 of the housing is sloped downward toward a drain aperture 42 which constitutes the lowest part of the floor.

In accordance with the present invention there is provided an electrically operated pump 44 carried by the housing, the pump having an inlet 46 and an outlet 48. The pump is energized through an electric cord 49 terminating in a plug 51. The pump inlet is connected with the drain aperture 42 and receives liquid and solid material therefrom. The outlet is connected with a hose 50 which is brought to a reel 53 carried in the front lower portion of the housing 10. From the reel 53 a hose section 54 extends, terminating in a dripless spout portion or hook formation 56. As shown in FIG. 1, the hose is adapted to extend over the rim 58 of the bowl 12 so as to empty therein. The spout or gooseneck portion 56 of the hose 54 is preferably somewhat stiff and self-supporting. The gooseneck or hook formation 56 has a retainer shoulder 57 adapted to engage the inside of the bowl rim as shown in FIG. 1, so as to minimize the possibility of the gooseneck 56 inadvertently slipping off the bowl rim. The resilience of the gooseneck 56 enables it to be spread apart slightly for its attachment to and removal from the bowl rim.

Referring to FIGS. 1 and 2, there are mounted inside of the housing 18 a series of water jets or nozzles 60 carried on the opposite walls 22 and 26. The jets are connected together by means of a pipe 62 which communicate with a second hose 64 extending outside of the housing. The hose 64 is provided with a resilient fitting 66 constituted of soft plastic or rubber and adapted to releasably connect to the spout 16 of the faucet. Connected between the hose 64 and pipes 62 is a canister 68 by which a detergent or a disinfectant can be introduced into the spray energizing from the jets, for the purpose of maintaining the housing odor-free and sanitary between uses.

The inlet hose 64 can be stored on a suitable reel 65 carried in the upper portion of the housing 10, as shown in FIGS. 1 and 2. The reel 65 can be constructed to surround the canister 68 and to be coupled to a solenoid valve now to be described.

Referring to FIGS. 1 and 4, in accordance with the present invention there is provided a novel control means comprising a solenoid 80 and solenoid valve 82 for regulating the flow of water into the housing through the inlet hose 64. The valve 82 is installed between the hose 64 and a pipe 62 connecting the jets 60, and when unenergized is in the "closed" position, wherein no water from the hose 64 can enter the housing. In such case, when the fitting 66 is connected to the faucet 16 and the latter turned on, the hose 64 will merely become pressurized, although in some cases the fitting 66 may be forced off the faucet. If this occurs, however, there will obviously be no likelihood of a flood, or of overflow from the housing. Normally, upon energization of the pump 44 by the user inserting the plug 51 into a suitable electrical receptacle, the solenoid 80 will simultaneously become energized, opening the valve 82 and enabling water from the faucet to pass from the hose 64 to the pipes 62 so as to emerge from the jets 60. By this arrangement, the valve 82 opens only during the operation of the pump 44, thus insuring that the water entering the housing will be removed therefrom by the pump by at least at an equivalent rate. As a result, there is never any overflow from the housing.

By the present invention, the bottom wall 20 includes a series of cleats 70 disposed toward one end, which are intended to support a partition 72. The partition operates to position the animal properly with respect to location of the drain aperture 42. Depending upon the size of the pet, the location of the partition 72 can be adjusted forwardly or rearwardly. Another series of cleats 71 is provided to retain an adjustable baffle 73 to serve as a barrier in order to shield the fore legs of the pet.

Referring to FIGS. 2 and 3, the housing 18 is constructed to be open at the top, and has a pair of folding doors 74, 76 which are fastened to the upright walls 22 amd 26 respectively by hinges as shown. Extending substantially completely across the open top is a grill 78 of metal bars or wire mesh. This feature of the apparatus enables the pet owner to observe the pet inside the housing without the likelihood of the animal jumping out. Thus, one can readily determine when the animal has finished using the apparatus.

The bottom of the housing 18 can have four or more castors 78 to enable the unit to be easily moved into the bathroom from a storage area and vice versa.

The unit is very simple to use. The housing is first positioned so that the spout 56 extends over the bowl rim 58 as shown in FIG. 1. With the partition 72 positioned to accommodate the size of the pet, the latter is led into the housing through the door 38. With the doors 74, 76 open, the owner can observe the animal through the grille 78. Following use, only the door 40 is opened. If necessary the partition 72 can be removed to enable the animal to exit (in the case of older or infirm pets). All doors are then closed, and the fitting 66 is attached to the faucet 16, after which the water is turned on, and the pump energized by inserting the plug 51 into a suitable receptacle. Simultaneously, the valve 82 is actuated to its "open" position, causing a spray of water to emerge from the nozzles 60, thus cleaning the interior of the housing. Detergent from the canister 68 is automatically dispensed as the water flows into the pipes 62, and to the jets 60. The rinse water and solids are then pumped from the housing through the hose 50 and spout 56 into the bowl 12. When sufficient pumping has occurred, the hose 66 can be removed from the faucet and the pump turned off, whereupon the unit is dried and rolled away to a place of storage.

Further, as provided by the invention, the electric supply cord 49 is carried by a reel 90, which is turnably mounted at the underside of the housing as seen in FIG. 1. Thus, when the appliance is not in use the cord 49 can be conveniently stored out of sight.

The invention further provides means for electrically heating air and supplying the same to the animal, such as might be desired after a wash or shampoo. This means comprises a combination electric blower and heater 92 carried in the lower portion of the housing 10, below the bottom wall 20. Connected with the blower and heater 92 are ducts 94 leading to risers 96 in the side walls of the housing, said risers terminating in hood 98 by which water is prevented from flowing into the heating ducts. The blower-heater can be conveniently energized by a separate switch, not shown. To facilitate washing and shampooing an animal, I provide a portable spray head 99, see FIG. 4, attached to a hose line 101 which can be connected to a three-way valve 103. By such arrangement the fixed jets can be turned off by the valve 103 and the spray water instead directed to the portable spray head 99, which then can be used on all different areas of the animal, sparing the face and eyes in most cases.

To enhance the external appearance of the appliance, the housing 10 can be provided with a depending rectangular skirt 102 which will hide the swivel casters 78.

By the provision of the reels 53, 65 and 90, the water hose and supply cord can be tucked away within the walls of the housing 10, thereby to effect a neat appearance.

From the foregoing it can be seen that I have provided a novel and improved pet wash and waste disposal apparatus which is simple in construction and yet very effective in operation. It provides a simple and feasible solution to a difficult problem, posed particularly to city dwellers. The units is portable and can be easily prepared for use in a very short period of time. No permanent connections to existing plumbing facilities are required. By the use of my improved apparatus the owner of a pet can not only wash and shampoo the animal with a minimum of effort and inconvenience but can also provide waste disposal facilities by which the keeping of a pet is made more pleasurable and less difficult, particularly in congested city areas. The apparatus is thus seen to represent a distinct advance and improvement in this field.

Variations and modifications are possible without departing from the spirit of the invention.

I claim:

1. A domestic appliance for use with pets, and in conjunction with existing bathroom facilities including, a water faucet and a flush bowl, comprising in combination:
   a. a housing having a watertight bottom wall and upright walls,
   b. said bottom wall having a drain aperture and being sloped toward said aperture,
   c. said housing having means for positioning a pet with the hind quarters thereof over and adjacent the aperture,
   d. an electrically operated pump having an inlet and an outlet said pump being carried by said housing,
   e. means connecting the inlet of said pump with said drain aperture to receive liquid and solid matter therefrom,
   f. hose means connected with the outlet of said pump for transferring said liquid and solid matter into the flush bowl, said hose means comprising a hook formation adapted to extend over the rim of the bowl and captively retain the hose in engagement therewith during use of the appliance,
   g. a water jet disposed inside said housing, and
   h. means including a second hose connected with said jet for supplying water thereto under pressure from the faucet, whereby after use by the pet the interior of the chamber can be sprayed clean and the resulting matter removed thereform and deposited into the bowl upon activation of said pump.

2. The invention as set forth in claim 1, wherein:
   a. said upright wall has an opening, and
   b. a door carried by said upright wall, constituting a watertight closure of the opening, the latter enabling easy access to the interior of the chamber by the pet.

3. The invention as set forth in claim 1, wherein:
   a. said housing is open at the top,
   b. a grille carried by the upright wall and extending across the open top, and
   c. a top door carried on said upright wall and adapted to provide a closure for said open top.

4. The invention as set forth in claim 1, wherein:
   a. said jet supplying means comprises a flexible hose connected at one end with said jet and having at its other end a resilient adapter fitting for elastic connection to said faucet.

5. The invention as set forth in claim 4, and further including:
   a. a canister for dispensing disinfectant, detergent and the like,
   b. said canister being carried by the housing and being connected with the hose carrying water to the jet.

6. The invention as set forth in claim 5, and further including:
   a. additional jets disposed inside the housing, and
   b. means connecting said additional jets to said hose to receive water therefrom.

7. The invention as set forth in claim 1, and further including:
   a. an adjustable partition carried inside said housing for properly positioning the pet therein, such that animals of widely varying sizes can be accommodated.

8. The invention as set forth in claim 1, and further including:
   a. an adjustable baffle carried inside said housing, providing a barrier for shielding the fore legs of the pet.

9. The invention as set forth in claim 2, wherein:
   a. said upright wall has an additional opening, opposite to the first, and
   b. an additional door carried by said housing, said additional opening constituting an exit door for the pet.

10. A domestic appliance as set forth in claim 1, and further including:
    a. a reel device carried in the upper portion of the housing, about which the second hose is wound to facilitate the storage thereof when not in use.

11. A domestic appliance as set forth in claim 10, and further including:
    a. An additional reel device carried in the lower portion of the housing, about which the said hose means is wound to facilitate its storage during periods of non-use.

12. A domestic appliance as set forth in claim 10, and further including:
    a. a second reel device disposed in the lower portion of the housing, and
    b. an electric supply cord adapted to be wound about a second reel device,
    c. said supply cord being connected to the electrically operated pump to energize the same.

13. A domestic appliance as set forth in claim 1, and further including:
    a. a plurality of casters carried at the bottom of the housing, and
    b. a depending skirt secured to the lower portion of the housing and concealing said casters when the housing is viewed from the exterior.

14. A domestic appliance as set forth in claim 1, and further including:
    a. an electric heater-blower unit carried in the lower portion of the housing, and
    b. means for connecting heated air from said heater-blower unit to upper portions of the housing, and for directing said air toward the interior of the housing to dry an animal disposed in the housing.

15. A domestic appliance as set forth in claim 14, wherein:
    a. said means for conducting heated air comprises a pair of ducts disposed in the lower portion of the housing and connected with said heater-blower unit, and comprises risers connected with said ducts respectively, and hoods attached to said risers,
    b. said hoods minimizing the likelihood of entry of water to the risers and ducts.

16. A domestic appliance as set forth in claim 1, and further including:

a. a portable spray device and valve means connecting said device to said second hose to provide an optional spray for washing the animal.

17. The invention as set forth in claim 1, wherein:

a. the hook formation comprises a retainer shoulder adapted to engage the inside lip of the bowl rim to thereb hold said hose thereon.

* * * * *